Figure 1:
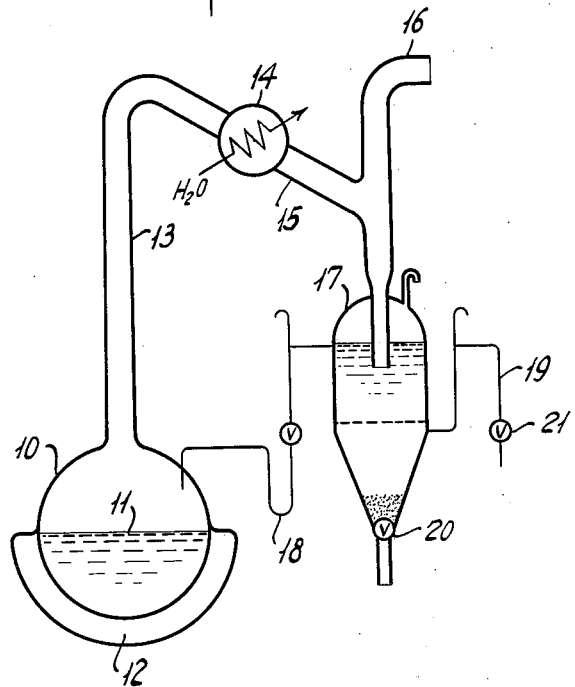

May 22, 1962  H. CHAFETZ  3,036,127

SUCCINIC ACID AND ANHYDRIDE SEPARATION PROCESS

Filed Dec. 24, 1957

United States Patent Office 3,036,127
Patented May 22, 1962

3,036,127
SUCCINIC ACID AND ANHYDRIDE SEPARATION PROCESS
Harry Chafetz, Poughkeepsie, N.Y., assignor to Texaco Inc., a corporation of Delaware
Filed Dec. 24, 1957, Ser. No. 704,943
4 Claims. (Cl. 260—537)

The instant invention relates to a process for separating succinic acid and anhydride from mixtures thereof with higher homologous dibasic acids.

The dibasic acids concerned herein are succinic, glutaric, adipic, pimelic, suberic, azelaic, sebacic, and higher acids of this series, e.g., $(CH_2)_n(COOH)_2$. Succinic acid and its anhydride are useful for converting into esters useful as plasticizers and the like. The other various dibasic acids of this oxalic acid series are similarly useful and have particularly enhanced value if available in pure form, e.g., adipic acid is used in the manufacture of nylon 66. Many processes, however, produce a complex crude mixture containing, in addition to impurities, a comparatively large amount of succinic acid which must be separated from the others as an important step in isolation of the individual dibasic acids.

A crude mixture of succinic and higher dibasic acids of the oxalic acid series can be made in a number of ways, for example, by oxidation of paraffinic and/or isoparaffinic hydrocarbons, e.g., refined wax, semi-refined wax, petrolatum, lubricating oil, slack wax, scale wax, foots-oil and the like, with air, hydrogen peroxide, nitric acid, chromic acid, ozone, or a mixture or a succession of these oxidizing agents. Preferably such crude mixture is made by two-stage process wherein a macrocrystalline paraffin wax is oxidized with air, usually in the presence of a metalliferous oxidation catalyst such as a manganese salt, until the Saponification Number of the mixture reaches at least 200 and, advantageously 300 to 600; thereafter the air oxidate is agitated intensively with nitric acid at a temperature between 180° and 450° F. for at least about one minute.

Other ways of making similar crude mixture containing succinic and higher dibasic acids of the oxalic acid series are: oxidation of levulinic acid with molecular oxygen in the presence of metalliferous oxidation catalyst; oxidation of hydroxy acids such as hydroxy stearic acid or glycerides thereof with nitric acid; oxidation of unsaturated fatty acids such as oleic acid, cotton seed fatty acid, or linseed fatty acid or their corresponding glycerides with nitric acid; oxidation of Fischer-Tropsch and oxo products, e.g., with nitric acid; and nitric acid oxidation of cycloparaffins such as cyclopentane, cycloalkanols such as cyclohexanol and cycloketones such as cyclohexanone.

Heretofore it has been proposed to use fractional crystallization from solvent for the separation of succinic acid from crude mixtures such as produced by the foregoing processes. Advantages of my process over such prior succinic separation processes include economy and simplicity.

My process takes advantage of the differential in the solubility of succinic acid and succinic anhydride in inert hydrophobic organic solvents at its normal boiling point and at a lower temperature and of the substantial insolubility of these solutes in such solvents at ordinary temperatures.

In its broadest aspect my invention involves separating succinic anhydride from a mixture thereof with higher molecular weight acids of the oxalic acid series, e.g., glutaric, adipic and other acids of the formula $$HOOC(CH_2)_mCOOH$$

where $m$ is an integer having a value greater than 2, by the process which comprises forming a distilland of said mixture and an inert hydrophobic organic solvent, said solvent having an atmospheric boiling point of at least about 175° C., vaporizing a portion of said distilland at a temperature of about 175–225° C., thereby forming a distillate comprising said solvent and succinic anhydride, condensing at least the major portion of the solvent and said anhydride comprising said distillate, cooling the resulting condensate to a temperature below about 150° F., separating the resulting solid phase succinic anhydride from condensed liquid solvent, returning said condensed solvent to said distilland, and continuing the foregoing operations until said distilland is substantially depleted of its original succinic anhydride content.

A more restricted aspect of my process is one wherein succinic anhydride and succinic acid are co-distilled simultaneously from the distilland. Thus, in this aspect of my invention separation of succinic acid or admixture of succinic acid and succinic anhydride from a mixture thereof with higher homologous dibasic acids, e.g., those of the oxalic acid series commencing with glutaric, involves forming the same kind of distilland as described above, vaporizing a portion of said distilland at a temperature of about 175–220° C., thereby forming a distillate comprising said solvent, succinic anhydride, succinic acid, and water, and condensing at least the major portion of the solvent and said anhydride and acid comprising said distillate, cooling the condensate to a temperature below about 150° F., separating the resulting solid phase succinic anhydride and succinic acid from the condensed liquid solvent, returning the condensed solvent to said distilland, and continuing the foregoing operations until said distillate is substantially depleted of original succinic acid content or original succinic acid and succinic anhydride content (should some anhydride be present with the acid initially).

It will be understood, however, that the product of this second aspect of my invention will constitute predominantly (actually preponderantly in most cases) succinic anhydride—even though no succinic anhydride is present in the initial distilland. Under the conditions of operation, succinic acid dehydrates to a large extent and the by-product water is separated from the condensed hydrophobic solvent. As described hereinafter, the separation of water can take place by partial condensation of the distillate or by total condensation thereof with separation of the hydrophobic solvent as a distinct liquid phase from water condensate.

In still another restricted aspect of my invention the succinic acid, or succinic acid and succinic anhydride admixture, present with the higher homologous dibasic acids of the oxalic acid series is formed into a distilland as before. In this case, however, the distillation is first performed from the distilland under rectifying conditions with a refluxing distilling column, packed tower, tray tower, or the like whereby the solvent and water are formed substantially exclusively into the overhead distillate fraction, while the higher boiling succinic and other dibasic acids and succinic anhydride remain as a bottoms fraction.

When the evolution of water from the distilland substantially ceases, as can be determined conveniently in a batch operation by totally condensing the solvent-water distillate, separating and refluxing the hydrophobic solvent to the distilling column, and measuring the gradually diminishing rate of increase of separated water from the condensed distillate, the succinic acid originally present in the distilland has been practically entirely converted into succinic anhydride. Superatmospheric pressure here helps suppress anhydride volatility.

At this stage codistillation of the succinic anhydride and solvent from the distilland is begun, this phase of the distillation being done without rectification so as to form a distillate of solvent and succinic anhydride. Condensing a major portion of the solvent and the distilled anhydride, then cooling the condensate to a temperature below about 150° F. permits separation of the resulting solid phase succinic anhydride from the condensed solvent, and the condensed solvent is returned to the distilland for continuing the co-distillation of the anhydride and solvent until the distilland is substantially depleted of its original succinic acid, or succinic acid and succinic anhydride, content.

FIGURE 1 of the drawing shows apparatus suitable for the practice of my process using a solvent less dense than water. Kettle 10 is partly filled with distilland 11, said distilland comprising a mixture of succinic and higher homologous dibasic acids and inert hydrophobic organic solvent, said solvent having boiling point between about 175° and about 220° C. Kettle 10 is heated by heating jacket 12. Vapor pipe 13 conducts distillate vapors into condenser 14 with only incidental rectification from wall effects. The condensate passes through pipe 15 into vented separator 17. Item 18 is a vented and valved solvent return line, item 19 a vented and valved water drain, and item 20 a dump valve for solid product.

Condenser 14 can be operated as a dephegmator, that is, partially condensing the distillate so as to keep water in the vapor phase while condensing at least a major part and usually virtually all of the organic solvent, succinic anhydride and succinic acid from the distillate. In this instance, the water vapor passes out vent 16 while the condensate of anhydride and solvent discharges into separator 17. As no liquid water need be separated in the operation, valve 21 is shut. The condensate is cooled in separator 17 below about 150° F. by means not shown to form an easily separable solid phase succinic anhydride and succinic acid in the condensate. The flow of condensing solvent keeps the solid anhydride and acid in the condenser discharge mobile, e.g., by a washing action. The comparatively low solubility of succinic anhydride and succinic acid in the organic solvent makes the separation of at least a substantial fraction of the anhydride and acid from condensed solvent quite simple by gravity means. The cooled solvent is returned to distilland 11 by means of line 18. Periodically or at the end of a run some or all of the collected solid succinic acid and anhydride is dumped from the separator by opening valve 20.

In the preferred instance, however, the distillate is totally condensed and cooled to a temperature between about 60° and about 150° F. but not so low as to solidify the solvent. In such case, a solvent layer separates by gravity from the water in separator 17 and is directed through line 18 back to kettle 10. Separating water phase collects in the bottom of separator 17, together with any solid phase succinic anhydride and succinic acid soluble in the water. Conveniently, this water layer can be removed periodically or continuously through overflow line 19 and valve 21, while any separated and accumulated succinic anhydride and succinic acid can be removed through valve 20.

Figure 2:
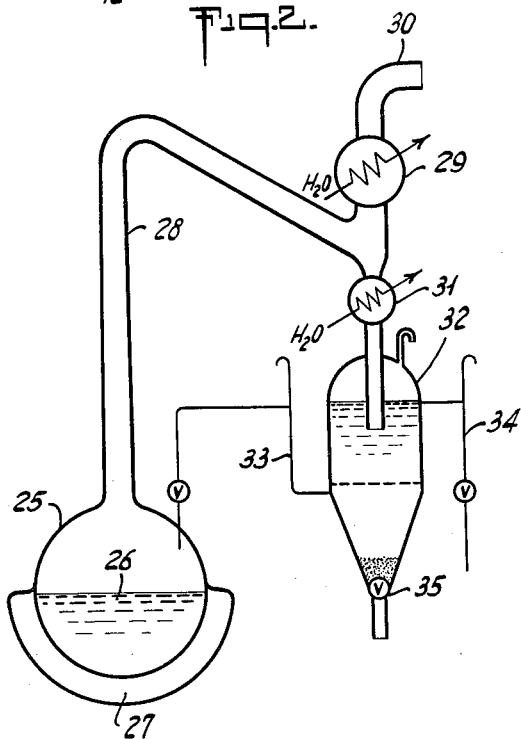

FIGURE 2 of the drawing shows apparatus suitable for the practice of my invention using a solvent denser than water. Kettle 25 is partially filled with distilland 26, said distilland comprising a mixture of succinic and higher homologous dibasic acids and inert hydrophobic organic solvent, said solvent having atmospheric boiling point between 175° C. and about 220° C. Kettle 25 is heated by heating jacket 27. Vapor pipe 28 conducts distillate vapors into condenser 29 with only incidental rectification. The condensate passes through cooler 31, thence into vented separator 32. Vapors are vented from the process through pipe 30, particularly water vapors if a partial condensing operation is employed on the distillate as hereinbefore described with respect to FIGURE 1.

The distillate is preferably totally condensed and cooled to a temperature of between about 60° and about 150° F., but not so low as to solidify the solvent. In the operation described in FIGURE 2 the solvent layer separates from the water in separator 32 as a bottom layer and is directed through line 33 back to kettle 25. Separating water phase collects in the top of separator 32 and is withdrawn therefrom by means of separator 34. Separated solid succinic anhydride and succinic acid, precipitated by the reduced temperature of the solvent phase, settle in the base of separator 32 and are periodically withdrawn therefrom by flushing through valve 35.

Of special importance in the practice of the foregoing embodiments of my process is the need to provide a substantially non-rectifying path for the vapors from the distilland to the condenser. This can be done most simply by use of a short tube, suitably insulated. Installation of packing, bubble cap trays, etc. and use of reflux of solvent or solvent-and-water condensate, which would serve as means for rectifying the ascending vapors, only serves to defeat my purpose in the succinic material-solvent because the distillation I use appears to be a simply co-distillation rather than an azeotropic distillation. Rectification causes the higher boiling components of the distillate to be returned to the distilland, rather than to reach the condenser for separation thereafter.

A further modification of the foregoing specific operations is to insert a rectifying column directly above the distilling kettle and, in the first stage of the operation, to return solvent reflux from the separator to the distilling column. The rectification effect is for maintaining the succinic acid and anhydride as a bottoms fraction while water and solvent ascend overhead for condensing and separation. The solvent is returned to the operation and the water is accumulated or discarded periodically or continually. When the water collection substantially ceases, the operator can conclude that this phase of the process is finished. Then the rectifying operation is cut out of the process, and the succinic anhydride remaining in the distilland is co-distilled with the solvent substantially as described with respect to FIGURE 1 or FIGURE 2 (depending on the density of the solvent employed relative to that of water).

By an inert, high-boiling hydrophobic organic solvent for this process I mean an organic liquid (at ordinary temperatures) capable of dissolving succinic acid and succinic anhydride to form a solution of at least about 5 grams of succinic acid and/or succinic acid and its anhydride per hundred grams of said solvent at temperature of 175–220° C., and exhibiting no substantial chemical change under process conditions. The suitable solvent (or solvent mixture) also must have an atmospheric boiling point of at least about 175° C., and advantageously of about 175–220° C. (for atmospheric pressure operation). It is to be understood, however, that reduced pressure can be used in the operation so as to maintain the distilland temperature between about 175° C. and about 200° C. whereby effective dehydration of succinic acid and co-distillation of succinic acid or succinic anhydride and succinic acid mixture can take place selectively from the other components in the distilland without deleterious effects either to the distilland or to the distillate.

Hydrophobic character of the solvent is necessary to secure rejection of water from the solvent and is a fairly common characteristic of inert organic solvents having a boiling point as high as those concerned here. Suitably, the solvent will not dissolve as much as a gram of water per hundred grams of solvent at atmospheric temperature and pressure, i.e., one atmosphere total pressure and 70° F. Thus, a wide variety of organic solvents are available for my process because the important properties of the solvent are its inertness, its immiscibility with water at ordinary temperature, its high boiling point, and its ability to dissolve at least a small amount of succinic acid and succinic anhydride at elevated temperature and to follow the normal characteristic of solvents with temperature, that of having considerably less solubility for the solute as the temperature falls. At the lower temperatures (150° F. and below) the preferred types of solvent dissolve substantially less than 5 grams of solute per hundred grams of the solvent.

Inertness of the solvent is an important consideration in the practice of my invention. The solvent should not be an amine or an alcohol (which would react with the dibasic acid mixture) or an ester (which could lead to transesterification). Solvents having aromatic nuclear structure appear to be specially suitable for the general practice of my process. The most suitable and so preferred specific inert solvents for the practice of my process are halohydrocarbons such as one or a mixture of chlorobenzenes, chlorotoluenes, chloroethylbenzenes, and chloroethyltoluenes; ethers such as cresyl methyl ethers, cresyl ethyl ethers, and cresyl benzyl ethers; and hydrocarbons such as one or a mixture of diethylbenzenes, butylbenzene, amylbenzene, and tetralin. Other types of solvents which are satisfactory are monobasic acids e.g., valeric acid, diethylacetic acid, caproic acid, (although their odor makes them less desirable than the foregoing solvents). I can also use aliphatic or aromatic nitriles such as benzonitrile, caprylic acid nitrile, tolunitriles. Aliphatic and aromatic nitrohydrocarbons are also suitable, e.g., nitrobenzene, nitropentane, and the like.

If the solvent has a boiling point substantially below 175° C., I have found that my process cannot be operated at atmospheric pressure to cause co-distillation of the succinic anhydride, or the succinic anhydride and acid, in any practical fraction relative to the solvent. To increase the pressure of the distillation and thereby raise the boiling temperature of the solvent would, of course, further suppress vaporization of any appreciable mol fraction of the high-boiling succinic material into the vapor phase.

To operate with a distilland boiling substantially above about 220° C. tends to cause degradation and/or decarboxylation of the succinic anhydride to an undesirable degree. Thus, for the preferred atmospheric pressure operation, the normal boiling point of the solvent should be about 175° and about 220° C. and is even more preferable between about 180° and about 200° C. Solvents having higher boiling points can, however, be used with reduced pressure operation to maintain boiling point of the distilland within the 180–220° C. range. However, for efficiency and economy in the operation, use of solvents having boiling points substantially above 250° C. necessitate undesirably low pressures.

Surprisingly, I am able to separate selectively succinic anhydride, or succinic acid and anhydride, from mixtures with higher homologous dibasic acids including glutaric acid. The glutaric acid, which also is capable of forming a cyclic anhydride, does not collect in the separator, but instead a good grade of a mixture of succinic anhydride and succinic acid or simply succinic anhydride collects there (depending on the distilling procedure).

The preferred source of crude dibasic acid mixture in the practice of my invention is one containing in the main, as dibasic acids, succinic, glutaric, and adipic acid from the air and nitric acid oxidation of macrocrystalline paraffin wax, described hereinbefore. In such process an aqueous phase containing practically all the dibasic acids separates by gravity from an oily phase after the nitric acid oxidation step. Weight proportions of specific dibasic acids in this aqueous layer is approximately as follows: 20 to 35% succinic ($C_4$); 15 to 25% glutaric ($C_5$); 15 to 25% adipic ($C_6$); 5 to 15% pimelic ($C_7$); and 5 to 25% suberic ($C_8$) and higher.

This aqueous phase is preferably treated with a cation exchanger to remove metal ions which would otherwise remain in the distilland. Useful cation exchangers are insoluble substances having sulfonic acid groups. They can be prepared from a natural product such as coal by reacting with a sulfonating agent, e.g., sulfuric acid, sulfur trioxide, or chlorosulfonic acid. They can also be made from phenolformaldehyde resins which have been sulfonated in the ring or which contain omega sulfonic groups introduced with reaction of formaldehyde and a sulfite. Also suitable are resins prepared by sulfonating copolymers of styrene and polyvinylbenzene. If the cation exchangers are purchased in a salt form, they can be readily converted into their hydrogen form for the metal salt removal by treating them with a dilute solution of a mineral acid such as hydrochloric or sulfuric acid.

Suitable cation exchange resins for removal of metal salts in the foregoing aqueous dibasic acid solution include the hydrogen forms of Amberlite IR–120 (the trade name for a high density, strongly acidic nuclear sulfonic acid cation exchange resin made by the Rohm & Haas Company) or Dowex 50 (the trade name of a similar strongly acidic cation exchange resin made by the Dow Chemical Company).

Substantially all the water and nitric acid are removed from said aqueous layer containing dibasic acids by distillation, preferably at reduced pressure of about 300 mm. Hg absolute. This also removes lower molecular weight monobasic acids and leaves a dark colored residue (frequently oily at ordinary room temperature) of crude dibasic acids. This is then mixed with preferably 1 to 7 parts of the high boiling inert solvent which is ordinarily sufficient to dissolve the entire residue at distilling temperature.

Should undissolved components remain, they will tend to impart uneven boiling and bumping to the distilland in my process but are otherwise innocuous. Use of a smaller weight proportion of solvent: dibasic acids crude than about 1:1 gives rise to an undesirably high boiling point in the distilland and/or too little solvent in the distillate to be sure of keeping the condensate cooler clean. Use of even larger proportions of solvent: crude than 7:1 adds to the cost of the process without significant advantage. In the initial stages of the operation, before or even during the distillation, it is frequently advantageous to use mechanical agitation of the distilland. Suitable materials of construction for the apparatus include glass, glass-lined steel, and a corrosion-resistant austenitic stainless steel.

The subsequent examples show ways in which my invention as been practiced but should not be construed as limiting the invention. All parts indicated are parts by weight, and all percentages are weight percentages unless otherwise noted. Pressure for the distillation operation was atmospheric, but it should be understood that lower pressures can be used providing that boiling temperature between about 175° C. and about 220° C. are maintained in the distilland for effective entrainment of the succinic acid and succinic anhydride without substantial decarboxylation and other degradation of the dibasic acids present.

*Example 1.*—The mixture of crude dibasic acids used were prepared by the further nitric acid oxidation of a previously air-oxidized petroleum wax having a Saponification No. of 504, the air oxidation being conducted in the presence of manganese catalyst. 8.02 parts of 10.6% nitric acid was used per part of air-oxidized wax oxidate in the further oxidation which was conducted at a temperature of 305–355° F. The crude dibasic acids were isolated from the aqueous phase of the reaction product by stripping off the water, unreacted nitric acid, and low boiling compounds at a pressure below 300 mm. Hg absolute. Proportions of specific dibasic acids in the brownish, somewhat oily, crystalline residue were: 27% succinic; 18% glutaric; 13% adipic; 8% pimelic, and 11% suberic and higher. There was also 4% water and 9% impurities in said residue, and it had a Neutralization Number of 720.

Sixty grams of this crude material and 196 grams of orthodichlorobenzene (99% ortho) was charged into a 3- neck flask equipped with a stirrer, a thermometer, a dropping funnel, and a distilling head with condenser. Rectification was only incidental. The distilland so formed was boiled at atmospheric pressure, and the condensate from the distillation was cooled to about 0° C. Water present in the condensate was separated and the condensate was filtered to remove solids. The so-treated condensate, free of discrete water and solids, was recycled to the distilland at approximately the same rate as the distillate takeoff rate. White, crystalline solids weighing 13.05 grams were separated from the first 1191 ml. of condensate. These solids were composed preponderantly of succinic anhydride with some succinic acid (as evinced by the Neut. No. of a weighed sample of the solids after hydrolysis being 1020 as compared to a Neut. No. for succinic anhydride of 1122 and of succinic acid of 950 by this method). About 85% of the succinic acid originally present in the sample of dibasic acids was collected as the solid fraction separated from the distillate.

*Example 2.*—A sample of the same mixture of crude dibasic acids as used in Example 1 was dissolved in water and passed through a column of the hydrogen form of Amberlite IR–120 cation exchange resin to remove metallic impurities. A mixture of crude yellowish crystalline dibasic acids was recovered from the ion exchange effluent by a stripping distillation at atmospheric pressure to a temperature of about 195° F. Proportions of specific dibasic acids in the mixture were 33% succinic, 19% glutaric, 15% adipic, 9% pimelic, and 11% suberic and higher. There were also 13% impurities. Neut. No. of the stripped residue was 770.

A distilland mixture was made by mixing 50 grams of the crude ion-exchanged stripped acid residue and 200 ml. of a technical grade of orthodichlorobenzene (85% ortho). The distillation equipment was the same as described in Example 1. The mixture was distilled, the distillate being collected in 100 ml. portions, cooled to about 65° F., separated from any discrete water present, and filtered to remove solids. Thus treated, the distillate was recycled to the distillation flask at a rate adjusted so that the volume of the distilland was never less than about 100 ml., the temperature of the distilland being maintained at between 180° and 185° C. Solids filtered from the distillate weighed 12.7 grams, these solids being a mixture of succinic anhydride and succinic acid equivalent to about 14.3 grams of succinic acid which represents about 87% of the succinic acid originally present in the sample of dibasic acids subjected to the co-distillation treatment.

*Example 3.*—A sample of the same mixture of crude stripped residue of the ion-exchanged stripped acid residue used in Example 2 was used in the following operation. A mixture of 50 grams of these acids and 75 ml. of a technical grade of diethylbenzene (a meta and para mixture having boiling range of 175 to 181° C.) was made up and distilled at atmospheric pressure in the same apparatus as used in Example 2. The distillate was cooled to about 50° F., filtered from solids, separated from discrete water present, and recycled to the distilland at approximately the same rate as fluid being taken off the distilland by the distillation.

The total weight of separated solids collected from the distillate was 13.8 grams; the solids were a mixture of succinic acid and succinic anhydride equivalent to about 14.9 grams of succinic acid. This represents about 91% of the succinic acid originally present in the sample of dibasic acids subjected to the co-distillation treatment.

*Example 4.*—A mixture of 30 grams of succinic acid, 10 grams of glutaric acid, 30 grams of adipic acid, and 225 ml. of a technical grade of dichlorobenzene (85% ortho) was distilled in the same apparatus as used in Example 2. The distillate was cooled to about 40° F., filtered of solids, separated from discrete liquid water present, and recycled to the distilland at approximately the same rate as the distillate takeoff rate from the distilland; the recycling was started after 100 ml. of distillate was collected.

From the first 900 ml. of distillate so processed 17.8 grams of solids were separated; from the next 700 ml. of distillate so processed 10.3 grams of solids were separated; from the next 600 ml. of distillate 1.5 grams of solids were separated, and from the last 600 ml. of distillate, 0.8 gram of solids were separated, the foregoing weights being determined on the solids after hydrolyzing them to convert any anhydride present therein into corresponding acid. The solids in the first two portions of distillate, namely, the 900 and 700 ml. portions, represented more than 80% of the succinic acid originally present in the sample of dibasic acids subjected to the co-distillation treatment.

*Example 5.*—A mixture of 25 grams of succinic acid, 25 grams of adipic acid, and 182 ml. of orthodichlorobenzene was formed into a distilland and the mixture distilled through an efficient fractionating column equipped with a condenser and receiver. A total of 60 ml. of distillate was collected, the distillate temperature range being 71–183° C. while the distilland temperature was 187–195° C. A total of 3.4 ml. of water (89% of the theoretical amount to be given off by conversion of 25 grams of succinic acid to its anhydride) was separated off the distillate and collected as discrete liquid water. (Pressure above atmospheric could also have been used in conjunction with the rectification or alone to suppress vaporization of the succinic anhydride being formed in this phase of the distilling treatment.) After this dehydrating, the resulting distilland could be further distilled at atmospheric pressure without rectification to recover the succinic anhydride as an overhead product thereby separated from the adipic acid in the distilland.

*Example 6.*—The mixture of crude dibasic acids used here was prepared by the further oxidation of air-oxidized wax (having a Saponification No. of 504 and oxidized in the presence of a manganese catalyst) with 8.02 parts of 10.6% nitric acid per part of air-oxidized wax oxidate using a temperature of 305–355° F. The aqueous phase of the reaction product was stripped of water, nitric acid, and other low boiling components at a pressure below 300 mm. Hg absolute to leave a brownish, somewhat oily, crystalline residue. This residue of very crude dibasic acids was dissolved in water and the solution passed through a column of the hydrogen form of Amberlite IR–120 cation exchange resin to remove impurities. A mixture of crude, yellowish, crystalline dibasic acids was recovered from the ion-exchanged effluent by stripping said effluent at atmosphereic pressure at a temperature of about 195° F. This mixture analyzed: 33% succinic acid, 19% glutaric acid, 15% adipic acid, 9% pimelic acid, 11% suberic and higher homologous dibasic acids, and 13% impurities. It had Neutralization No. of 770.

A portion, 50 grams, of these recovered crude ion-exchanged acids was mixed with 200 ml. of orthodichlorobenzene, and the mixture subjected to distillation treatment in a flask connected to a fractionating column equipped with a condenser and receiver. A total of 75 ml. of distillate was collected, the distillate temperature range being 77–166° C., the distilland temperature range being 180–183° C. This treatment was effective to convert the bulk of the succinic acid present in the ion-exchanged acids mixture into succinic anhydride. Further distillation without rectification can be used to remove the succinic acid and succinic anhydride remaining in the distilland as an overhead fraction with the high boiling solvent.

I claim:

1. A process for separating succinic acid from a mixture thereof with at least one dibasic acid of the formula $HOOC(CH_2)_nCOOH$ where $n$ is an integer greater than 2 which comprises forming a distilland of said mixture and an inert hydrophobic organic solvent, said solvent having an atmospheric boiling point of between 175 and 220° C. and being capable of dissolving at least about 5 grams of a member selected from the group consisting of succinic acid, succinic anhydride and mixtures thereof per 100 grams of said solvent at a temperature of 175–220° C., distilling a portion of said distilland at a temperature between 175 and 220° C. thereby forming a vapor comprising succinic anhydride, succinic acid, said solvent and water, condensing at least the major portion of said solvent, said succinic anhydride, and said succinic acid comprising said vapor, cooling the resulting condensate to a temperature between about 60 and 150° F., separating the resulting solid phase succinic anhydride and succinic acid from the condensed liquid solvent, returning said condensed solvent to said distilland and continuing the foregoing operations until said distilland is substantially depleted of succinic acid.

2. The process of claim 1 wherein said mixture is the product of oxidizing a paraffinic hydrocarbon and the quantity of said solvent used is approximately 1 to 7 parts per part of said mixture.

3. The process of claim 1 wherein said solvent is dichlorobenzene.

4. A process in accordance with claim 1 wherein said solvent is diethylbenzene.

References Cited in the file of this patent

UNITED STATES PATENTS

| | | |
|---|---|---|
| 1,424,138 | Bailey et al. | July 25, 1922 |
| 2,365,290 | Price et al. | Dec. 19, 1944 |
| 2,716,133 | Pooler | Aug. 23, 1955 |
| 2,729,600 | Beach | Jan. 3, 1956 |
| 2,794,831 | McKinnis | June 4, 1957 |

OTHER REFERENCES

Bouveault: Bull. soc. chim. Paris (3) 19, 562–565 (1898).

Noller: "Chemistry of Organic Compounds," 1951, pp. 731 to 734.